United States Patent Office 3,778,436
Patented Dec. 11, 1973

3,778,436
ACYLTHIOACETYL CEPHALOSPORINS
Uwe Treuner, Regensburg, and Hermann Breuer, Burgweinting, Germany, assignors to E. R. Squibb & Sons, Inc., Princeton, N.J.
No Drawing. Filed Sept. 14, 1971, Ser. No. 180,490
The portion of the term of the patent subsequent to July 24, 1980, has been disclaimed
Int. Cl. C07d 99/24
U.S. Cl. 260—243 C        8 Claims

ABSTRACT OF THE DISCLOSURE

Acylthioacetylcephalosporins of the general formula

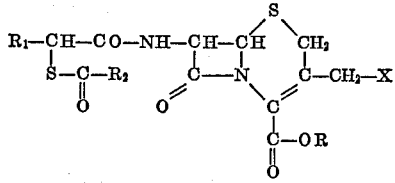

wherein R is hydrogen, lower alkyl, aralkyl, tri(lower alkyl)silyl, a salt forming ion, or the group

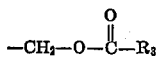

$R_1$ is hydrogen, lower alkyl, cycloalkyl, aralkyl, aryl or certain heterocyclic groups; $R_2$ is lower alkyl, cycloalkyl, aryl or certain heterocyclic groups; $R_3$ is lower alkyl, aryl or aralkyl; and X is hydrogen, hydroxy, lower alkanoyloxy, aralkanoyloxy, the radical of a nitrogen base, a quaternary ammonium radical, or together X and R represent a bond linking carbon and oxygen in a lactone ring; are useful as antibacterial agents.

SUMMARY OF THE INVENTION

This invention relates to new thiocarbonylthioacetylcephalosporins of the formula

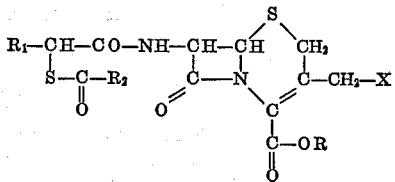

R represents hydrogen, lower alkyl, aralkyl, tri(lower alkyl)silyl, a salt forming ion or the group

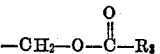

$R_1$ represents hydrogen, aryl, lower alkyl, saturated and unsaturated cycloalkyl, aralkyl or certain heterocyclic groups; $R_2$ represents lower alkyl, cycloalkyl, aryl or certain heterocyclic groups; $R_3$ represents lower alkyl, aryl or aralkyl. X is hydrogen, hydroxy, lower alkanoyloxy, aroyloxy, aralkanoyloxy, the radical of a nitrogen base, a quaternary ammonium radical, or together X and R represent a bond linking carbon and oxygen in a lactone ring.

The preferred members within each group are as follows: R is hydrogen, lower alkyl, alkali metal, trimethylsilyl or

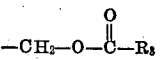

especially hydrogen, methyl, pivaloyloxy, sodium or potassium; $R_1$ is hydrogen, phenyl, thienyl, furyl, oxazolyl, isoxazolyl or thiazolyl, especially phenyl, $R_2$ is lower alkyl, especially methyl or ethyl, or phenyl; $R_3$ is lower alkyl, preferably methyl or t-butyl; and X is preferably hydrogen or acetoxy.

DETAILED DESCRIPTION OF THE INVENTION

The various groups represented by the symbols have the meanings defined below and these definitions are retained throughout this specification.

The lower alkyl groups are straight or branched chain hydrocarbon radicals having one to eight carbons in the chain, for example, methyl, ethyl, propyl, isopropyl, butyl, isobutyl, t-butyl, amyl or the like.

The cycloalkyl groups include saturated and unsaturated cyclic hydrocarbon groups having three to seven carbon atoms and up to two double bonds, for example, cyclopropyl, cyclobutyl, cyclopentyl, cyclohexyl, cycloheptyl, cyclobutenyl, cyclopentenyl, cyclohexenyl, cyclohexadienyl and the like. The five and six carbon members are preferred and among the unsaturated members the 1,4-cyclohexadienyl group is preferred.

The aryl groups are monocyclic carbocyclic aryl groups including simply substituted members. By way of illustration, this includes the phenyl ring and simply substituted phenyl containing one to three substituents (preferably only one) such as the halogens (chlorine and bromine being preferred), lower alkyl groups such as those defined above, lower alkoxy groups (i.e., lower alkyl groups of the type defined above attached to an oxygen), hydroxy, carboxy and the like. In the case of the last two named substituents there is preferably only one, especially in the para position of the phenyl. Illustrative are phenyl, o-, m- and p-chlorophenyl, o-, m- and p-bromophenyl, 3,4-dichlorophenyl, 3,5-dibromophenyl, o-, m- and p-tolyl, p-methoxyphenyl, 3,4,5 - trimethoxyphenyl, p - hydroxyphenyl, p-carboxyphenyl and the like.

The aralkyl groups include a monocyclic carbocyclic aryl group attached to a lower alkyl group, both as defined above. Illustrative are benzyl, o-, m- or p-chlorobenzyl, o-, m- or p-bromobenzyl, o-, m- or p-methylbenzyl, phenethyl, p-chlorophenethyl, 3,5-diethylbenzyl, 3,4,5-trichlorobenzyl and the like.

The lower alkanoyloxy, aroyloxy and aralkanoyloxy groups represented by X include the acyl group of acid esters. The lower alkanoyl radicals are the acyl radicals of lower fatty acids containing alkyl radicals of the type described above. The lower alkanoyloxy groups include, for example, acetoxy, propionyloxy, butyryloxy and the like. The aroyloxy groups are derived from monocyclic carbocyclic aryl groups of the kind described. Similarly the aralkanoyloxy groups consist of monocyclic carbocyclic aryl and alkanoyloxy radicals of the type described. X also represents the radical of an amine, e.g., an alkylamine like methylamine, ethylamine, dimethylamine, triethylamine, aralkylamine like dibenzylamine, N,N'-dibenzylpyridinium, pyridinium, 1-quinolinium, 1-picolinium, etc. X and R may also join together, as indicated above, to form a bond linking carbon and oxygen in a lactone ring.

The heterocyclic groups represented by $R_1$ and $R_2$ are monocyclic heterocyclic radicals (having 5 or 6 atoms exclusive of hydrogen which are carbon, sulfur, nitrogen and oxygen, no more than two being other than carbon), including thienyl, furyl, oxazolyl, isoxazolyl and thiazolyl, as well as these heterocyclics with the substituents halo, lower alkyl (particularly methyl and ethyl), lower alkoxy (particularly methoxy and ethoxy) or phenyl.

The salt forming ions represented by R may be metal ions, e.g., aluminum, alkali metal ions such as sodium or potassium, alkaline earth metal ions such as calcium or magnesium, or an amine salt ion, of which a number are known for this purpose, for example, dibenzylamine, N,N-dibenzylethylenediamine, methylamine, triethylamine, procaine, N-ethylpiperidine, etc.

The new acylthioacetylcephalosporins of this invention are produced by reacting a 7-aminocephalosporanic acid compound of Formula II [which includes particularly 7-aminocephalosporanic acid (7-ACA), 7 - amino - 3 - desacetoxycephalosporanic acid (7-ADCA) and other derivatives] of the formula (II)
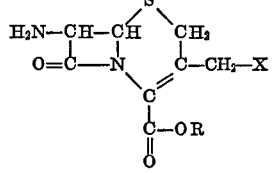

with an acylthioacetic acid of the formula (III)
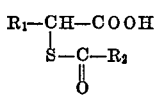

or an activated derivative of the Formula II. The symbols have the meanings already defined.

The activated derivatives referred to include, for example, the reaction product with an anhydride forming reagent such as ethylchloroformate, benzoyl chloride, pivaloyl chloride, etc., or with bis-imidazolecarbonyl, dicyclohexylcarbodiimide, p-nitrophenol or the like.

The reaction between 7-aminocephalosporanic acid compound and the acylthioacetic acid may be effected, for example, by dissolving or suspending the latter in an inert organic solvent such as chloroform, methylene chloride, dioxane, benzene or the like, and adding, at about room temperature or below, about an equimolar amount of an anhydride forming reagent, e.g., ethyl chloroformate, benzoylchloride or the like, or other activating compound such as dicyclohexylcarbodiimide, along with a salt forming organic base, such as triethylamine, pyridine or the like, followed, after an interval, by the addition of the 7-aminocephalosporanic acid compound. The product of the reaction is then isolated by conventional procedures, e.g., by concentration or evaporation of the solvent.

When R is the acyloxymethyl group

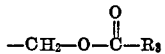

this group may be introduced into the 7-aminocephalosporanic acid moiety prior to the reaction with the acylthioacetic acid or the activated derivative by treatment with one to two moles of a halomethyl ester of the formula (IV)      hal—CH$_2$OCOR$_3$ wherein hal is halogen, preferably chlorine or bromine, in an inert organic solvent such as dimethylformamide, acetone, dioxane, benzene or the like, at about ambient temperature or below.

As an alternative, a product of Formula I may be produced by reacting a salt, e.g., an alkali metal salt, of the formula (V)      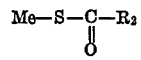

with a compound of the formula (VI)
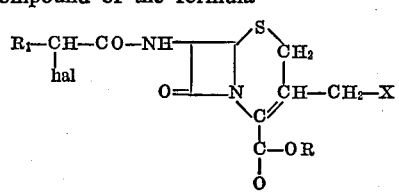

or derivative thereof. Me represents a metal, hal is halogen, preferably chlorine or bromine and R and R$_1$ are the same as above.

The acylthioacetic acid of Formula III may be produced according to the following general method.

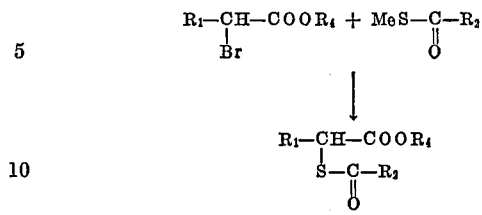

(wherein R$_4$ is hydrogen or lower alkyl) by a procedure analogous to Bonner, Jour. Org. Chem. 33, 1831 (1968).

The symbols have the meanings already defined.

Further process details are also provided in the illustrative examples.

Certain of the compounds of this invention may exist in different optically active forms. The various stereoisomeric forms as well as the racemic mixtures are within the scope of the invention.

The compounds of this invention have a broad spectrum of antibacterial activity against both gram positive and gram negative organisms such as *Staphylococcus aureus, Salmonella schottmuelleri, Pseudomonas aeruginosa, Proteus vulgaris, Escherichia coli* and *Streptococcus pyrogenes*. They may be used as antibacterial agents in a prophylactic manner, e.g., in cleaning or disinfecting compositions, or otherwise to combat infections due to organisms such as those named above, and in general may be utilized in a manner similar to cephalothin and other cephalosporins. For example, a compound of Formula I or a physiologically acceptable salt thereof may be used in various animal species in an amount of about 1 to 200 mg./kg., daily, orally or parenterally, in single or two to four divided doses, to treat infections of bacterial origin, e.g., 5.0 mg./kg. in mice.

Oral forms give prompt high blood levels which are maintained for relatively long periods.

Up to about 600 mg. of a compound of Formula I or a physiologically acceptable salt thereof may be incorporated in an oral dosage form such as tablets, capsules or elixirs or in an injectable form in a sterile aqueous vehicle prepared according to conventional pharmaceutical practice.

They may also be used in cleaning or disinfecting compositions, e.g., for cleaning barns or dairy equipment, at a concentration of about 0.01 to 1% by weight of such compounds admixed with, suspended or dissolved in conventional inert dry or aqueous carriers for application by washing or spraying. They are also useful as nutritional supplements in animal feeds.

The following examples are illustrative of the invention. All temperatures are on the centigrade scale. Additional variations may be produced in the same manner by appropriate substitution in the starting material.

EXAMPLE 1

DL-7-[2-(Acetylthio)-2-phenylacetamido]cephalosporanic acid and salts

To 1.8 gm. (5 mmol.) of DL-7-[α-(bromophenylacetamido)]-cephalosporanic acid are dissolved in 15 ml. of absolute dimethylformamide and then 0.55 g. (5 mmol.) of potassium thioacetate in 15 ml. of dimethyl formamide are added with stirring. The temperature of the reaction mixture is controlled by cooling so that it does not exceed 40°. After 10 minutes, the reaction solvent is poured into 350 ml. of cold water and extracted twice with 200 ml. portions of ethyl acetate. The ethyl acetate extract is dried over sodium sulfate and the solvent is distilled off in vacuo. The oily residue is crystallized by treatment with ether-petroleum ether. DL-7-[2-(acetylthio)-2-phenylacetamido]-cephalosporanic acid is obtained in 86% yield, M.P. 40° (dec.).

By dissolving the acid in a small amount of n-butanol, adding an equivalent amount of potassium 2-ethylhexanoate, then adding ether gives the potassium salt, M.P. 178° (dec.). The sodium salt is formed similarly.

EXAMPLE 2

DL-7-[2-(benzoylthio)-2-phenylacetamido]cephalosporanic acid and potassium salt

By substituting 0.8 g. (5 mmol.) of potassium thiobenzoate for the potassium thioacetate in the procedure of Example 1, there are obtained DL-7-[2-benzoylthio)-2-phenylacetamido]cephalosporanic acid, M.P. 118° (dec.) and the potassium salt, M.P. 145° (dec.).

The following additional products having the formula (c) in the table are obtained by the procedure of Example 1 by substituting for the DL - 7 - [α-(bromophenylacetamido)]cephalosporanic acid, the starting material (a), and for the potassium thioacetate, the starting material (b) with the substituents indicated in the table:

TABLE

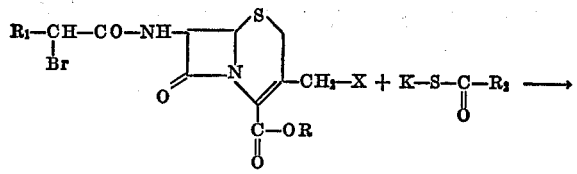

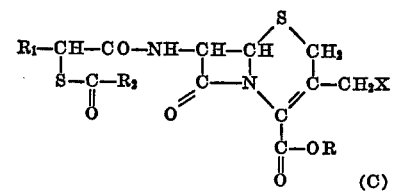

(C)

| Example | R | R₁ | R₂ | X |
|---|---|---|---|---|
| 3 | CH₃ | H | CH₃ | H |
| 4 | C₂H₅ | CH₃ | C₂H₅ | OH |
| 5 | CH₃ | C₃H₇ | C₂H₅ | Pyridinium |
| 6 | —CH₂OC(O)—CH(CH₃)₂ | C₆H₅CH₂ | C₆H₅ | OCOCH₃ |
| 7 | —CH₂OC(O)—C₆H₅ | 4-ClC₆H₄ | H | OCOCH₃ |
| 8 | C₂H₅ | 3,4-(CH₃O)₂C₆H₃ | C₂H₅ | H |
| 9 | C₂H₅ | 3,4,5-(CH₃O)₃C₆H₂ | C₂H₅ | OCOCH₃ |
| 10 | Na | 4-CH₃C₆H₄ | (thienyl) | OCOCH₃ |
| 11 | Lactone (+X) | 3,4-(Br)₂C₆H₃CH₂ | H | Lactone (+R) |
| 12 | C₂H₅ | 2,4-(Cl)₂C₆H₃ | C₂H₅ | OCOCH₃ |
| 13 | C₂H₅ | C₆H₅-(isoxazolyl-CH₃) | C₂H₅ | OCOCH₃ |
| 14 | C₂H₅ | (thienyl) | C₂H₅ | OCOCH₃ |
| 15 | C₆H₅CH₂ | (furyl) | (furyl) | OOCH₂C₆H₅ |
| 16 | CH₂OC(O)—C(CH₃)₃ | C₆H₅ | C₆H₅ | H |
| 17 | CH₂O—C(O)—C(CH₃)₃ | C₆H₅ | C₆H₅ | OOC—C₆H₅ |
| 18 | H | C₆H₅ | C₆H₅ | H |
| 19 | Na | C₆H₅ | C₂H₅ | H |
| 20 | CH₂O—C(O)—C(CH₃)₃ | C₆H₅ | C₆H₅ | OCOCH₃ |
| 21 | N(C₂H₅)₃ | C₆H₅ | C₆H₅ | H |
| 22 | K | C₆H₅ | CH₃ | H |
| 23 | K | C₆H₅ | CH₃ | OCOCH₃ |
| 24 | H | (cyclohexyl) | CH₃ | H |
| 25 | H | (furyl) | C₆H₅ | OCOCH₃ |

What is claimed is:
1. A compound of the formula

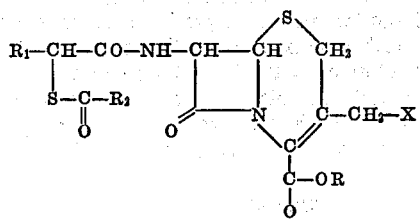

wherein R is hydrogen, lower alkyl, $R_4$-phenyl-lower alkyl tri(lower alkyl)silyl,

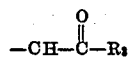

or a salt forming ion of the group consisting of aluminum, alkali metal, alkaline earth metal, dibenzylamine, N,N-dibenzylethylenediamine, methylamine, triethylamine, procaine and N-ethylpiperidine; $R_1$ is hydrogen, lower alkyl, saturated or unsaturated cycloalkyl of 3 to 7 carbons, $R_4$-phenyl-lower alkyl, $R_4$-phenyl or a monocyclic heterocyclic selected from the group consisting of thienyl, furyl, oxazolyl, isoxazolyl and thiazolyl and halo, lower alkyl, lower alkoxy or phenyl substituted members of that group; $R_2$ is lower alkyl, cycloalkyl of 3 to 7 carbons, $R_4$-phenyl or one of said monocyclic heterocyclics defined above; $R_3$ is lower alkyl, $R_4$-phenyl or $R_4$-phenyl-lower alkyl; $R_4$ is halogen, lower alkoxy, lower alkyl, hydroxy or carboxy; and X is hydrogen, hydroxy, lower alkanoyloxy, $R_4$-phenyl-CO-O, $R_4$-phenyl-lower alkanoyloxy, lower alkylamine, dibenzylamine, N,N'-dibenzylpyridinium, pyridinium, 1-quinolinium, 1-picolinum or together X and R are a bond linking carbon and oxygen in a lactone ring.

2. A compound as in claim 1 wherein $R_1$ is phenyl.
3. A compound as in claim 2 wherein $R_2$ is lower alkyl and R is hydrogen.
4. Alkali metal salt of a compound of claim 2.
5. A compound as in claim 2 wherein R is hydrogen and $R_2$ is phenyl.
6. A compound as in claim 3 wherein $R_2$ the lower alkyl group is methyl.
7. Alkali metal salt of the compound of claim 5.
8. Alkali metal salt of the compound of claim 6.

References Cited
UNITED STATES PATENTS
3,627,760   12/1971   Bickel et al. _____ 260—243 C NICHOLAS S. RIZZO, Primary Examiner U.S. Cl. X.R.
424—246

PO-1050
(5/69)

UNITED STATES PATENT OFFICE
CERTIFICATE OF CORRECTION

Patent No. 3,778,436      Dated December 11, 1973

Inventor(s) Uwe Treuner and Hermann Breuer

It is certified that error appears in the above-identified patent and that said Letters Patent are hereby corrected as shown below:

In line 6 of the headnote, delete the terminal date of the patent "July 24, 1980" and substitute --October 23, 1990 --.

Signed and sealed this 18th day of February 1975.

(SEAL)
Attest:

RUTH C. MASON
Attesting Officer

C. MARSHALL DANN
Commissioner of Patents
and Trademarks